United States Patent
Lu et al.

(10) Patent No.: US 9,489,516 B1
(45) Date of Patent: Nov. 8, 2016

(54) DETECTION OF MALWARE USING AN INSTRUMENTED VIRTUAL MACHINE ENVIRONMENT

(71) Applicant: Palo Alto Networks, Inc., Santa Clara, CA (US)

(72) Inventors: ChienHua Lu, Santa Clara, CA (US); Bo Qu, Santa Clara, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 67 days.

(21) Appl. No.: 14/331,113

(22) Filed: Jul. 14, 2014

(51) Int. Cl.
| | |
|---|---|
| *G06F 11/00* | (2006.01) |
| *G06F 12/14* | (2006.01) |
| *G06F 12/16* | (2006.01) |
| *G08B 23/00* | (2006.01) |
| *G06F 21/56* | (2013.01) |
| *G06F 21/55* | (2013.01) |
| *G06F 21/53* | (2013.01) |

(52) U.S. Cl.
CPC ............ *G06F 21/566* (2013.01); *G06F 21/53* (2013.01); *G06F 21/554* (2013.01); *G06F 21/567* (2013.01)

(58) Field of Classification Search
CPC ....... G06F 21/56; G06F 21/566; G06F 21/53
See application file for complete search history.

(56) References Cited

U.S. PATENT DOCUMENTS

| | | | |
|---|---|---|---|
| 5,983,348 A | 11/1999 | Ji | |
| 7,409,718 B1 | 8/2008 | Hong et al. | |
| 7,496,963 B2 | 2/2009 | Shipp | |
| 7,568,233 B1 | 7/2009 | Szor et al. | |
| 7,603,713 B1 | 10/2009 | Belov | |
| 7,649,838 B2 | 1/2010 | Fishteyn et al. | |
| 7,664,855 B1 | 2/2010 | Freed et al. | |

(Continued)

FOREIGN PATENT DOCUMENTS

| | | |
|---|---|---|
| WO | 2012134584 | 10/2012 |
| WO | 2013067505 | 5/2013 |
| WO | 2013067508 | 5/2013 |
| WO | 2013134206 | 9/2013 |

OTHER PUBLICATIONS

Davidoff et al., "Chapter 12: Malware Forensics", Network Forensics: Tracking Hackers Through Cyberspace, Pearson Education Inc., Jun. 2012, 60 pages.

(Continued)

*Primary Examiner* — Amir Mehrmanesh
*Assistant Examiner* — Quy Pham
(74) *Attorney, Agent, or Firm* — Van Pelt, Yi & James LLP

(57) ABSTRACT

Various techniques for detection of malware using an instrumented virtual machine environment are disclosed. In some embodiments, detection of malware using an instrumented virtual machine environment includes instantiating a first virtual machine in the instrumented virtual machine environment, in which the first virtual machine is configured to support installation of two or more versions of a resource; installing a first version of the resource on the first virtual machine and monitoring the instrumented virtual machine environment while executing the first version of the resource with a malware sample opened using the first version of the resource; and installing a second version of the resource on the first virtual machine and monitoring the instrumented virtual machine environment while executing the second version of the resource with the malware sample opened using the second version of the resource.

15 Claims, 5 Drawing Sheets

(56) References Cited

U.S. PATENT DOCUMENTS

| | | |
|---|---|---|
| 7,779,472 B1 | 8/2010 | Lou |
| 7,823,202 B1 | 10/2010 | Nucci et al. |
| 7,870,610 B1 | 1/2011 | Mitchell et al. |
| 7,930,273 B1* | 4/2011 | Clark .................. G06F 8/71 707/638 |
| 7,945,908 B1 | 5/2011 | Waldspurger |
| 7,958,555 B1 | 6/2011 | Chen et al. |
| 8,011,010 B2 | 8/2011 | Michael et al. |
| 8,141,132 B2 | 3/2012 | Oliver et al. |
| 8,151,352 B1 | 4/2012 | Novitchi |
| 8,201,246 B1 | 6/2012 | Wu et al. |
| 8,209,680 B1 | 6/2012 | Le et al. |
| 8,225,317 B1 | 7/2012 | Chiueh et al. |
| 8,260,914 B1 | 9/2012 | Ranjan |
| 8,291,468 B1 | 10/2012 | Chickering |
| 8,316,440 B1 | 11/2012 | Hsieh et al. |
| 8,321,936 B1 | 11/2012 | Green et al. |
| 8,347,100 B1 | 1/2013 | Thornewell et al. |
| 8,359,651 B1 | 1/2013 | Wu et al. |
| 8,370,938 B1 | 2/2013 | Daswani et al. |
| 8,402,543 B1 | 3/2013 | Ranjan et al. |
| 8,407,324 B2 | 3/2013 | McDougal |
| 8,438,639 B2 | 5/2013 | Lee et al. |
| 8,443,363 B1 | 5/2013 | Brennan, III et al. |
| 8,443,449 B1 | 5/2013 | Fan et al. |
| 8,464,341 B2 | 6/2013 | Cohen |
| 8,479,295 B2 | 7/2013 | Sahita et al. |
| 8,484,732 B1 | 7/2013 | Chen et al. |
| 8,484,739 B1 | 7/2013 | Seshadri |
| 8,510,827 B1 | 8/2013 | Leake et al. |
| 8,516,591 B2 | 8/2013 | Fly et al. |
| 8,521,667 B2 | 8/2013 | Zhu et al. |
| 8,533,842 B1 | 9/2013 | Satish |
| 8,539,577 B1 | 9/2013 | Stewart et al. |
| 8,566,946 B1 | 10/2013 | Aziz |
| 8,572,740 B2 | 10/2013 | Mashevsky et al. |
| 8,578,481 B2 | 11/2013 | Rowley |
| 8,584,239 B2 | 11/2013 | Aziz et al. |
| 8,631,489 B2 | 1/2014 | Antonakakis et al. |
| 8,646,071 B2 | 2/2014 | Pereira et al. |
| 8,646,088 B2 | 2/2014 | Pistoia et al. |
| 8,656,491 B1 | 2/2014 | Daswani et al. |
| 8,677,487 B2 | 3/2014 | Balupari et al. |
| 8,683,584 B1 | 3/2014 | Daswani et al. |
| 8,707,441 B1 | 4/2014 | Cidambi et al. |
| 8,756,691 B2 | 6/2014 | Nachenberg |
| 8,763,125 B1 | 6/2014 | Feng |
| 8,826,426 B1 | 9/2014 | Dubey |
| 8,838,570 B1 | 9/2014 | English |
| 8,966,625 B1 | 2/2015 | Zuk et al. |
| 9,003,526 B2 | 4/2015 | El-Moussa |
| 9,117,079 B1* | 8/2015 | Huang ............... G06F 21/566 |
| 9,223,962 B1 | 12/2015 | Kashyup |
| 9,317,680 B2 | 4/2016 | Carter, III et al. |
| 2004/0030913 A1 | 2/2004 | Liang et al. |
| 2004/0107416 A1 | 6/2004 | Buban et al. |
| 2005/0177602 A1 | 8/2005 | Kaler et al. |
| 2005/0283837 A1 | 12/2005 | Olivier |
| 2006/0168024 A1 | 7/2006 | Mehr et al. |
| 2007/0039053 A1 | 2/2007 | Dvir |
| 2007/0050850 A1 | 3/2007 | Katoh et al. |
| 2007/0106986 A1 | 5/2007 | Worley et al. |
| 2007/0192857 A1 | 8/2007 | Ben-Itzhak |
| 2007/0261112 A1 | 11/2007 | Todd et al. |
| 2008/0016552 A1 | 1/2008 | Hart |
| 2008/0127338 A1 | 5/2008 | Cho et al. |
| 2008/0155694 A1 | 6/2008 | Kwon et al. |
| 2008/0177755 A1 | 7/2008 | Stern et al. |
| 2008/0177994 A1 | 7/2008 | Mayer |
| 2008/0209562 A1 | 8/2008 | Szor |
| 2008/0229393 A1 | 9/2008 | Congdon |
| 2008/0256633 A1 | 10/2008 | Arnold et al. |
| 2008/0263658 A1 | 10/2008 | Michael et al. |
| 2008/0263659 A1 | 10/2008 | Alme |
| 2008/0320594 A1 | 12/2008 | Jiang |
| 2009/0019547 A1 | 1/2009 | Palliyil et al. |
| 2009/0055928 A1 | 2/2009 | Kang et al. |
| 2009/0144826 A2 | 6/2009 | Piccard |
| 2009/0150419 A1 | 6/2009 | Kim et al. |
| 2009/0235357 A1 | 9/2009 | Ebringer |
| 2009/0241190 A1 | 9/2009 | Todd et al. |
| 2009/0282485 A1 | 11/2009 | Bennett |
| 2009/0288167 A1 | 11/2009 | Freericks et al. |
| 2010/0037314 A1 | 2/2010 | Perdisci et al. |
| 2010/0043072 A1 | 2/2010 | Rothwell |
| 2010/0107252 A1 | 4/2010 | Mertoguno |
| 2010/0115586 A1 | 5/2010 | Raghavan et al. |
| 2010/0154059 A1 | 6/2010 | McNamee et al. |
| 2010/0162350 A1 | 6/2010 | Jeong et al. |
| 2010/0175132 A1 | 7/2010 | Zawadowskiy et al. |
| 2010/0281458 A1 | 11/2010 | Paladino |
| 2011/0041179 A1 | 2/2011 | St. Hlberg |
| 2011/0055923 A1 | 3/2011 | Thomas |
| 2011/0090911 A1 | 4/2011 | Hao et al. |
| 2011/0099620 A1 | 4/2011 | Stavrou et al. |
| 2011/0161955 A1 | 6/2011 | Woller et al. |
| 2011/0167495 A1 | 7/2011 | Antonakakis et al. |
| 2011/0173698 A1 | 7/2011 | Polyakov et al. |
| 2011/0185425 A1 | 7/2011 | Lee et al. |
| 2011/0271342 A1 | 11/2011 | Chung et al. |
| 2011/0296412 A1 | 12/2011 | Banga et al. |
| 2011/0296486 A1 | 12/2011 | Burch et al. |
| 2012/0042381 A1 | 2/2012 | Antonakakis et al. |
| 2012/0054869 A1 | 3/2012 | Yen et al. |
| 2012/0084860 A1 | 4/2012 | Cao et al. |
| 2012/0089700 A1 | 4/2012 | Safruti et al. |
| 2012/0096549 A1 | 4/2012 | Amini et al. |
| 2012/0117650 A1 | 5/2012 | Nachenberg |
| 2012/0117652 A1 | 5/2012 | Manni et al. |
| 2012/0192274 A1 | 7/2012 | Odom et al. |
| 2012/0233691 A1 | 9/2012 | Jiang |
| 2012/0240224 A1 | 9/2012 | Payne et al. |
| 2012/0255018 A1 | 10/2012 | Sallam |
| 2012/0255019 A1 | 10/2012 | McMamee et al. |
| 2012/0255021 A1 | 10/2012 | Sallam |
| 2012/0255031 A1 | 10/2012 | Sallam |
| 2012/0278889 A1 | 11/2012 | El-Moussa |
| 2012/0291042 A1 | 11/2012 | Stubbs et al. |
| 2012/0291131 A1 | 11/2012 | Turkulainen et al. |
| 2013/0014259 A1 | 1/2013 | Gribble et al. |
| 2013/0047147 A1 | 2/2013 | McNeill |
| 2013/0055394 A1 | 2/2013 | Beresnevichiene et al. |
| 2013/0091350 A1 | 4/2013 | Gluck |
| 2013/0091570 A1 | 4/2013 | McCorkendale et al. |
| 2013/0104230 A1 | 4/2013 | Tang et al. |
| 2013/0145002 A1 | 6/2013 | Kannan et al. |
| 2013/0145008 A1 | 6/2013 | Kannan et al. |
| 2013/0152200 A1* | 6/2013 | Alme .................. H04L 63/145 726/24 |
| 2013/0227165 A1 | 8/2013 | Liu |
| 2013/0232574 A1 | 9/2013 | Carothers |
| 2013/0246685 A1 | 9/2013 | Bhargava et al. |
| 2013/0298184 A1 | 11/2013 | Ermagan et al. |
| 2013/0298192 A1 | 11/2013 | Kumar et al. |
| 2013/0298230 A1 | 11/2013 | Kumar et al. |
| 2013/0298242 A1 | 11/2013 | Kumar et al. |
| 2013/0298243 A1 | 11/2013 | Kumar et al. |
| 2013/0298244 A1 | 11/2013 | Kumar et al. |
| 2013/0326625 A1 | 12/2013 | Anderson et al. |
| 2014/0059641 A1 | 2/2014 | Chapman et al. |
| 2014/0096131 A1 | 4/2014 | Sonnek et al. |
| 2014/0283037 A1 | 9/2014 | Sikorski et al. |
| 2014/0337836 A1 | 11/2014 | Ismael |
| 2014/0380474 A1 | 12/2014 | Paithane et al. |
| 2015/0058984 A1 | 2/2015 | Shen et al. |
| 2015/0067862 A1 | 3/2015 | Yu |
| 2015/0195299 A1 | 7/2015 | Zoldi et al. |

OTHER PUBLICATIONS

Ligh et al., "Chapter 5: Researching Domains and IP Addresses," Malware Analyst's Cookbook, John Wiley & Sons, 2011, 38 pages.

(56) References Cited

OTHER PUBLICATIONS van der Heide et al., "DNS Anomaly Detection," System and Network Engineering Research Group, University of Amsterdam, Feb. 6, 2011, 20 pages.

Abu Rajab et al., "A Multifaceted Approach to Understanding the Botnet Phenonmenon," Proceedings of the 6th ACM SIGCOMM conference on Internet measurement, 2006, 12 pages.

Schechter et al., "Fast Detection of Scanning Worm Infections," Recent Advances in Intrusion Detection: 7th International Symposium RAID 2004 Proceedings, 2004, 24 pages.

Sikorski et al., "Chapter 14: Malware-Focused Network Signatures," Practical Malware Anlaysis, No Starch Press, Feb. 2012, 13 pages.

Chen et al., "Chapter 4: Guarding Against Network Intrusions," Network and System Security, Elsevier Inc., 2009, 5 pages.

Author Unknown, "FireEye Malware Analysis", FireEye.com, FireEye, Inc., 2010.

Author Unknown, "Hybrid Sandboxing for Detecting and Analyzing Advanced and Unknown Malware", Blue Coat Systems, Inc., 2014.

Lindorfer et al., "Detecting Enviroment-Sensitive Malware", Recent Advances in Intrusion Detection. Springer Berlin Heidelberg, 2011.

Singh et al., "Hot Knives Through Butter: Evading File-based Sandboxes", FireEye, Inc., Feb. 2014.

Author Unknown, "Multi-Vector Virtual Execution (MVX) Engine", FireEye, Inc., http://www.fireeye.com/products-and-solutions/virtual-execution-engine.html, 2014.

Wagener et al., "An Instrumented Analysis of Unknown Software and Malware Driven by Free Libre Open Source Software", Signal Image Technology and Internet Based Systems, 2008. SITIS'08. IEEE International Conference on. IEEE, 2008.

Lau et al., "Measuring Virtual Machine Detection in Malware using DSD Tracer", Sophoslabs, Journal in Computer Virology, 2008.

Sun et al. "Malware Virtualization-resistant behavior detection", 2011 IEEE, pp. 912-917.

Dittrich et al., P2P as Botnet Command and Control; A Deeper Insight, 2008 3rd International Conference on Malicious and Unwanted Software (MALWARE), Oct. 2008, IEEE, vol. 10, pp. 41-48.

Zang et al., "Botnet Detection Through Fine Flow Classifcation", CSE Dept. Technical Report No. CSE11-001, p. 1-17, Jan. 31, 2011.

Landecki, Grzegorz, Detecting Botnets, Linux Journal, Jan. 1, 2009.

Karasaridis, Anestis et al., Wide-scale Botnet Detection and Characterization, Dec. 14, 2010.

Author Unknown, Advanced Persistent Threats (APT), What's an APT? A Brief Definition, Damballa, Dec. 14, 2010.

Author Unknown, Executive Overview, The Command Structure of the Aurora Botnet, Damballa, Mar. 2010.

Strayer, W. Timothy et al. Detecting Botnets with Tight Command and Control, BBN Technologies, Nov. 2006.

Ramachandran, Anirudh et al., Revealing Botnet Membership Using DNSBL Counter-Intelligence, Jul. 7, 2006.

Goebel, Jan et al., Rishi: Identify Bot Contaminated Hosts by IRC Nickname Evaluation, Apr. 2007.

Gu, Guofei et al., BotSniffer: Detecting Botnet Command and Control Channels in Network Traffic, Feb. 2008.

Gu, Guofei et al., BotHunter: Detecting Malware Infection Through IDS-Driven Dialog Correlation, Aug. 2007.

Gu, Guofei et al., BotMiner: Clustering Analysis of Network Traffic for Protocol- and Structure-Independent Botnet Detection, Jul. 2008.

Royal, Paul, Analysis of the Kraken Botnet, Damballa, Apr. 9, 2008.

Livadas, Carl et al., Using Machine Learning Techniques to Identify Botnet Traffic, BBN Technologies, Nov. 2006.

Binkley, James R. et al., An Algorithm for Anomaly-based Botnet Detection, Jul. 2006.

Yen, Ting-Fang et al., Traffic Aggregation for Malware Detection, Jul. 2008.

Author Unknown, Anatomy of a Targeted Attack, Damballa, Dec. 3, 2008.

Author Unknown, Layer 8, How and Why Targeted Attacks Exploit Your Users, Damballa, Nov. 2011.

Author Unknown, Targeted Attacks for Fun and Profit, An Executed Guide to a New and Growing Enterprise Threat, Damballa, Oct. 13, 2008.

Author Unknown, AV, IDS/IPS and Damballa's Response to Targeted Attacks, A Technology Comparison, Damballa, Nov. 2008.

Author Unknown, Updated on the Enemy, A Deconstruction of Who Profits From Botnets, Damballa, May 13, 2009.

Author Unknown, A Day in the Life of a BotArmy, Damballa, 2008.

Ollmann, Gunter, Botnet Communication Topologies, Understanding the Intricacies of Bonet Command and Control, Damballa, Jun. 2009.

Ollmann, Gunter, The Botnet vs. Malware Relationship, The One to one Botnet Myth, Damballa, Jun. 2009.

Author Unknown, Closed Window, How Failsafe Enhancements Dramatically Limit Opportunities for Malware Armies and other Targeted Attacks, Damballa, Sep. 23, 2009.

Author Unknown, Damballa's In-The-Cloud Security Model, Enterprise Protection Moves Beyond the Network Perimeter, Damballa, Aug. 24, 2008.

Ollmann, Gunter, Extracting CnC from Malware, The Role of malware Sample Analysis in Botnet Detection, Damballa, Dec. 8, 2009.

Ollmann, Gunter, The Opt-IN Botnet Generation, Hacktivism and Centrally Controlled Protesting, Social Networks, Damballa, Apr. 26, 2010.

Ollmann, Gunter, Serial Variant Evasion Tactics, Techniques Used to Automatically Bypass Antivirus Technologies, Damballa, Oct. 7, 2009.

Author Unknown, Damballa: A Different Approach, Targeted Attacks Requires a New Solution, Damballa, Sep. 23, 2008.

Author Unknown, Trust Betrayed, What to Do When a Targeted Attack Turns Your Networks Against You, Damballa, Feb. 22, 2008.

Author Unknown, How to Be a Hero in the War Against BotArmies, Damballa, 2008.

Giroire, Frederic et al., Exploiting Temporal Persistence to Detect Convert Botnet Channels, Sep. 2009.

Russ White, "High Availability in Routing", Mar. 2004, Cisco Systems, vol. 7, Issue 1, pp. 2-14.

Yadav et al., "Detecting Algorithmically Generated Malicious Domain Names", Nov. 2010.

Nazario et al., As the Net Churns: Fast-Flux Botnet Observations, IEEE, pp. 24-31, Sep. 5, 2008.

\* cited by examiner

US 9,489,516 B1

DETECTION OF MALWARE USING AN INSTRUMENTED VIRTUAL MACHINE ENVIRONMENT

BACKGROUND OF THE INVENTION

A firewall generally protects networks from unauthorized access while permitting authorized communications to pass through the firewall. A firewall is typically a device or a set of devices, or software executed on a device, such as a computer, that provides a firewall function for network access. For example, firewalls can be integrated into operating systems of devices (e.g., computers, smart phones, or other types of network communication capable devices). Firewalls can also be integrated into or executed as software on computer servers, gateways, network/routing devices (e.g., network routers), or data appliances (e.g., security appliances or other types of special purpose devices).

Firewalls typically deny or permit network transmission based on a set of rules. These sets of rules are often referred to as policies. For example, a firewall can filter inbound traffic by applying a set of rules or policies. A firewall can also filter outbound traffic by applying a set of rules or policies. Firewalls can also be capable of performing basic routing functions.

BRIEF DESCRIPTION OF THE DRAWINGS

Various embodiments of the invention are disclosed in the following detailed description and the accompanying drawings.

DETAILED DESCRIPTION

Figure 1:
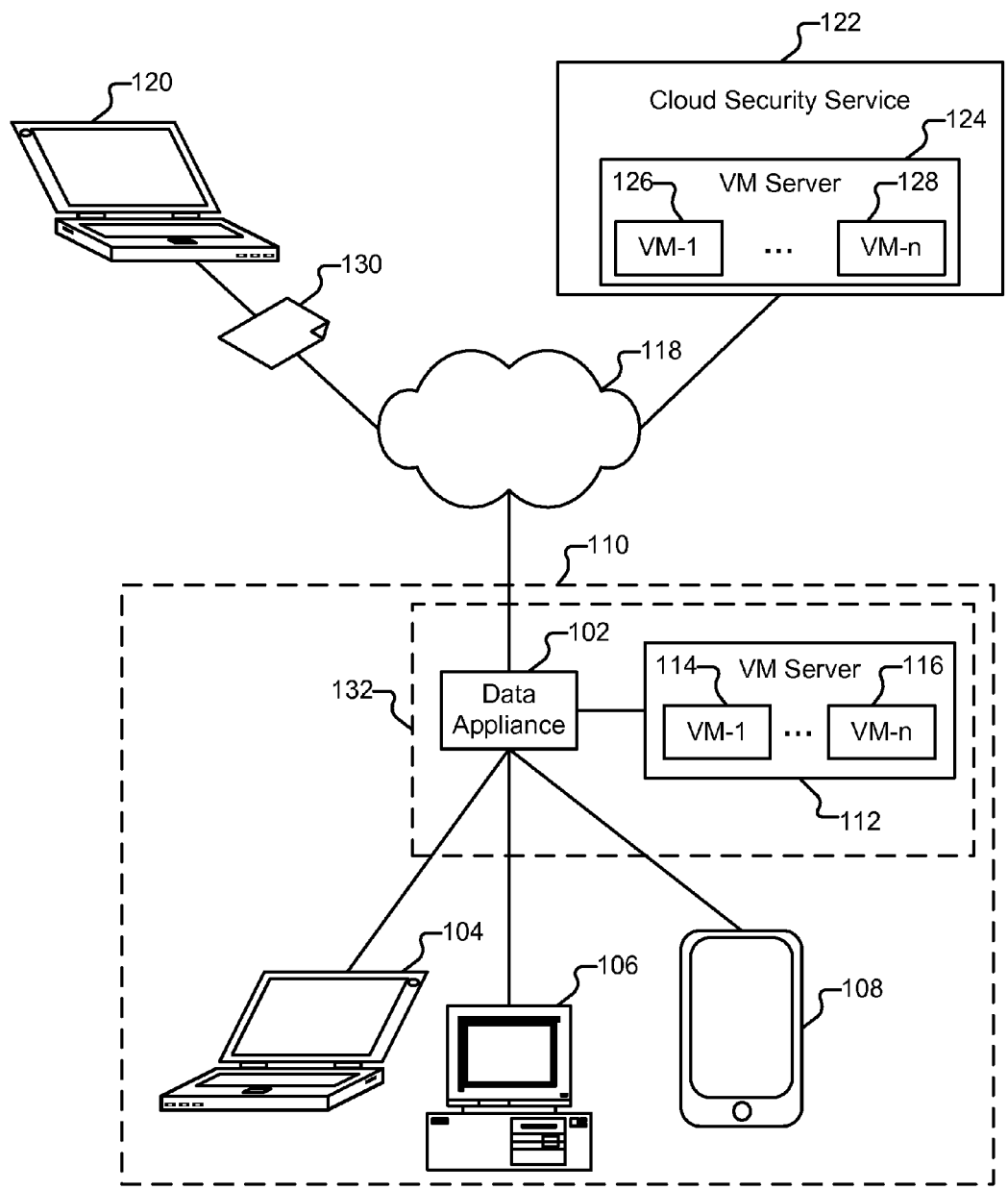
FIG. 1 is a functional diagram of an architecture for providing detection of malware using an instrumented virtual machine environment in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A firewall generally protects networks from unauthorized access while permitting authorized communications to pass through the firewall. A firewall is typically a device, a set of devices, or software executed on a device that provides a firewall function for network access. For example, a firewall can be integrated into operating systems of devices (e.g., computers, smart phones, or other types of network communication capable devices). A firewall can also be integrated into or executed as software applications on various types of devices or security devices, such as computer servers, gateways, network/routing devices (e.g., network routers), or data appliances (e.g., security appliances or other types of special purpose devices).

Firewalls typically deny or permit network transmission based on a set of rules. These sets of rules are often referred to as policies (e.g., network policies or network security policies). For example, a firewall can filter inbound traffic by applying a set of rules or policies to prevent unwanted outside traffic from reaching protected devices. A firewall can also filter outbound traffic by applying a set of rules or policies (e.g., allow, block, monitor, notify or log, and/or other actions can be specified in firewall rules or firewall policies, which can be triggered based on various criteria, such as described herein).

Security devices (e.g., security appliances, security gateways, security services, and/or other security devices) can include various security functions (e.g., firewall, anti-malware, intrusion prevention/detection, proxy, and/or other security functions), networking functions (e.g., routing, Quality of Service (QoS), workload balancing of network related resources, and/or other networking functions), and/or other functions. For example, routing functions can be based on source information (e.g., IP address and port), destination information (e.g., IP address and port), and protocol information.

A basic packet filtering firewall filters network communication traffic by inspecting individual packets transmitted over a network (e.g., packet filtering firewalls or first generation firewalls, which are stateless packet filtering firewalls). Stateless packet filtering firewalls typically inspect the individual packets themselves and apply rules based on the inspected packets (e.g., using a combination of a packet's source and destination address information, protocol information, and a port number).

Application firewalls can also perform application layer filtering (e.g., using application layer filtering firewalls or second generation firewalls, which work on the application level of the TCP/IP stack). Application layer filtering firewalls or application firewalls can generally identify certain applications and protocols (e.g., web browsing using Hyper-Text Transfer Protocol (HTTP), a Domain Name System (DNS) request, a file transfer using File Transfer Protocol (FTP), and various other types of applications and other protocols, such as Telnet, DHCP, TCP, UDP, and TFTP (GSS)). For example, application firewalls can block unauthorized protocols that attempt to communicate over a standard port (e.g., an unauthorized/out of policy protocol attempting to sneak through by using a non-standard port for that protocol can generally be identified using application firewalls).

Stateful firewalls can also perform stateful-based packet inspection in which each packet is examined within the context of a series of packets associated with that network transmission's flow of packets/packet flow (e.g., stateful firewalls or third generation firewalls). This firewall technique is generally referred to as a stateful packet inspection as it maintains records of all connections passing through the firewall and is able to determine whether a packet is the start of a new connection, a part of an existing connection, or is an invalid packet. For example, the state of a connection can itself be one of the criteria that triggers a rule within a policy.

Advanced or next generation firewalls can perform stateless and stateful packet filtering and application layer filtering as discussed above. Next generation firewalls can also perform additional firewall techniques. For example, certain newer firewalls sometimes referred to as advanced or next generation firewalls can also identify users and content. In particular, certain next generation firewalls are expanding the list of applications that these firewalls can automatically identify to thousands of applications. Examples of such next generation firewalls are commercially available from Palo Alto Networks, Inc. (e.g., Palo Alto Networks' PA Series firewalls).

For example, Palo Alto Networks' next generation firewalls enable enterprises to identify and control applications, users, and content—not just ports, IP addresses, and packets—using various identification technologies, such as the following: APP-ID for accurate application identification, User-ID for user identification (e.g., by user or user group), and Content-ID for real-time content scanning (e.g., controls web surfing and limits data and file transfers). These identification technologies allow enterprises to securely enable application usage using business-relevant concepts, instead of following the traditional approach offered by traditional port-blocking firewalls. Also, special purpose hardware for next generation firewalls implemented, for example, as dedicated appliances generally provide higher performance levels for application inspection than software executed on general purpose hardware (e.g., such as security appliances provided by Palo Alto Networks, Inc., which utilize dedicated, function specific processing that is tightly integrated with a single-pass software engine to maximize network throughput while minimizing latency).

Dynamic Analysis to Identify and Block Unknown Threats

However, a significant challenge for security detection techniques is to identify threats (e.g., malware, which refers to malicious programs, such as programs attempting to perform malicious or undesired actions) attempting to use new exploits, such as zero-day threats that have not previously been identified (e.g., targeted and unknown threats). For example, a new zero-day threat and/or an Advanced Persistent Threat (APT) (e.g., various techniques using malware to exploit vulnerabilities in systems and often using an external command and control for continuously monitoring and extracting data from a specific target, often using stealthy, persistent methods that can evade traditional security measures, such as signature-based malware detection measures) that has not previously been identified (e.g., for which no signature yet exists) can exploit new or unresolved vulnerabilities in an application or operation system.

In particular, modern attackers are increasingly using targeted and new unknown variants of malware to avoid detection by traditional security solutions. For example, advanced security threats (e.g., advanced cyber-attacks) are employing stealthy, persistent methods to evade traditional security measures. Skilled adversaries demand that modern security teams re-evaluate their basic assumptions that traditional intrusion prevention systems, antivirus, and single-purpose sandbox appliances are up to the task of defeating advanced security threats, such as APTs.

To address this, new and improved techniques are needed to efficiently and effectively identify such new and evolving malware. For example, by executing suspect files (e.g., malware samples) in a virtual environment (e.g., an instrumented virtual environment, which is sometimes also referred to as using a sandbox analysis of malware samples, which can be unknown threats) and observing their behavior, such malware can be quickly and accurately identified, even if the malware sample has not been previously analyzed and detected.

Once a file is deemed malicious (e.g., a malware sample is deemed to be malware), protections can be automatically generated using a cloud security service (e.g., implementing a dynamic security analysis of malware samples in a scalable cloud-based, virtual environment to directly observe the behavior of potentially malicious malware and exploits) to be delivered to subscribers of the cloud security service (e.g., within minutes or hours of detection). For example, such techniques can also be used to forensically determine who/what was targeted, including the application used in the delivery, any Uniform Resource Locator addresses (URLs) that were part of the attack, etc. (e.g., when an unknown threat is discovered, techniques disclosed herein can automatically generate protections to block the threat across the cyber kill-chain, sharing these updates with subscribers of the cloud security service within minutes or hours of detection, such that these quick updates can stop rapidly spreading malware, as well as identify and block the proliferation of potential future variants without any additional action or analysis). As disclosed herein, the cloud security service identifies unknown malware, zero-day exploits, and Advanced Persistent Threats (APTs) by directly executing them in a scalable cloud-based, virtual sandbox environment (e.g., an instrumented virtual environment). Also, the cloud security service automatically creates and disseminates protections in near real-time to help security teams meet the challenge of advanced security threats. In an example implementation, cloud security service extends the next-generation firewall platform that natively classifies all traffic across many different applications, and the cloud security service can apply a behavioral analysis regardless of ports or encryption, including full visibility into web traffic, email protocols (SMTP, IMAP, POP), FTP, SMB, and/or other protocols to facilitate detection and dissemination protections in near real-time to respond to such advanced security threats.

However, detection of malware using an instrumented virtual environment can be costly in terms of required computing resources (e.g., including processor and memory usage and computing time) used to perform dynamic security analysis using such an instrumented virtual environment. For example, existing sandbox approaches to malware detection typically only install one version of software (e.g., applications or other software) per virtual machine instance, which can be inefficient and/or limit malware detection rates (e.g., as certain malware may only exploit vulnerabilities in certain versions of software). As another example, some other existing approaches execute multiple virtual machine instances with different software configurations (e.g., sequentially or simultaneously), but performing such approaches can be very resource consuming and/or time consuming.

Thus, what are needed are new and improved techniques for detection of malware using an instrumented virtual machine environment. For example, various techniques described herein can more efficiently perform detection of malware using an instrumented virtual machine environment (e.g., more efficiently using computing resources, including processor and memory usage and computing time, used to perform dynamic security analysis using such an instrumented virtual environment). In addition, these techniques described herein can also provide an enhanced detection rate of malware using an instrumented virtual machine environment that is performed more efficiently as further discussed below.

Accordingly, various techniques for detection of malware using an instrumented virtual machine environment are disclosed. In some embodiments, detection of malware using an instrumented virtual machine environment includes instantiating a first virtual machine in the instrumented virtual machine environment, in which the first virtual machine is configured to support installation of two or more versions of a resource; installing a first version of the resource on the first virtual machine and monitoring the instrumented virtual machine environment while executing the first version of the resource with a malware sample opened using the first version of the resource; and installing a second version of the resource on the first virtual machine and monitoring the instrumented virtual machine environment while executing the second version of the resource with the malware sample opened using the second version of the resource. In an example implementation, the second version of the resource is installed on the first virtual machine without having to re-instantiate the first virtual machine. In some embodiments, any items that are associated with a particular version of the resource can be renamed in order to conceal (e.g., hide) the presence of that version of the resource having been installed in the system environment. For example, any file related items and/or registry key related items can be renamed and various additional techniques can be performed for handling any new process and/or service related items as further described below, such that the system environment can be returned to an appearance of a clean state as would be apparent to another version of the resource (e.g., as any items associated with the first version of the resource have been hidden from detection by the renaming of such items to different names/directories and/or renaming any such items to different registry key name/paths, and/or starting/stopping of any processes and/or services, such as further described below with respect to FIG. 3).

For example, the resource can include an executable application, and the malware sample can include a file in a format that is compatible with the executable application (e.g., the application can open the malware sample file). In particular, the instrumented virtual machine environment is monitored while executing each version of the resource with the malware sample opened using each version of the application for at least a predetermined period of time or until malicious behavior is detected (e.g., if there are four versions of the application, then a six minute period of time can be equally allocated among each of the four versions of the application, such that the malware sample is opened using each of the four versions of the malware sample and monitored for approximately one minute and thirty seconds).

In some embodiments, detection of malware using an instrumented virtual machine environment further includes storing a plurality of installed versions of the resource using dummy file names for one or more registry files and one or more executable files associated with the resource; and for each version of the resource to be executed, renaming one or more of the dummy file names associated with the version of the resource being executed to a predetermined file name (e.g., the dummy file names that are needed for properly executing a selected version of the application can be renamed to expected file names so that the selected version of the application can execute properly).

In some embodiments, detection of malware using an instrumented virtual machine environment further includes preloading one or more system files (e.g., required libraries, such as dynamically loaded libraries (DLLs)) that are used by the first version of the resource and/or the second version of the resource into a new resource system file location directory; and overriding an installer for the resource to redirect the installer to the new resource system file location directory.

In some embodiments, detection of malware using an instrumented virtual machine environment further includes receiving the malware sample at a cloud security service from a security device, in which the instrumented virtual environment is monitored during execution of each version of the resource with the malware sample opened using each version of the resource to determine whether the malware sample indicates potentially malicious behavior In some embodiments, detection of malware using an instrumented virtual machine environment further includes capturing network traffic while monitoring the instrumented virtual machine environment. In some embodiments, the instrumented virtual machine environment is configured to include at least one kernel hook and/or at least one user level hook. In some embodiments, the instrumented virtual machine environment is configured to include at least one honey file.

Accordingly, various techniques for detection of malware using an instrumented virtual machine environment are disclosed. For example, using such techniques can facilitate an efficient and enhanced detection of malware using an instrumented virtual machine environment. As will be apparent to one skilled in the art in view of the various techniques and embodiments described herein, while the various techniques described herein for detection of malware using an instrumented virtual machine environment are described with respect to virtual environments using a security service (e.g., a cloud security service), such techniques can similarly be applied to various other security environments, including, for example, performed in part or completely using security devices such as appliances, gateways, servers, and/or other security platforms capable of implementing various virtual environment techniques disclosed herein.

FIG. 1 is a functional diagram of an architecture for providing detection of malware using an instrumented virtual machine environment in accordance with some embodiments. For example, such an environment can detect and prevent malware from causing harm (e.g., malicious software can include any executable program, such as active content, executable code, and scripts, that can interfere with operation of a computing device or computer network, attempt unauthorized access of data or components of a computing device, and/or perform various other malicious, unauthorized, and/or undesirable activities). In particular, a variety of attempts by a malicious individual to propagate malware (e.g., malware 130) via system 120 are described, as are techniques for thwarting that propagation or execution of such malware in protected network computing environments, such as for protecting computing devices within an enterprise network 110.

In the example shown in FIG. 1, client devices 104, 106, and 108 are a laptop computer, a desktop computer, and a tablet (respectively) present in an enterprise network 110. Data appliance 102 is configured to enforce policies regarding communications between clients, such as clients 104 and 106, and nodes outside of enterprise network 110 (e.g., reachable via external network 118, such as the Internet). Examples of such policies include ones governing traffic shaping, quality of service, and routing of traffic. Other examples of policies include security policies such as ones requiring the scanning for threats in incoming (and/or outgoing) email attachments, website downloads, files exchanged through instant messaging programs, and/or other file transfers. In some embodiments, appliance 102 is also configured to enforce policies with respect to traffic that stays within enterprise network 110.

Appliance 102 can take a variety of forms. For example, appliance 102 can be a dedicated device or set of devices. The functionality provided by appliance 102 can also be integrated into or executed as software on a general purpose computer, a computer server, a gateway, and/or a network/routing device. For example, in some embodiments, services provided by data appliance 102 are instead (or in addition) provided to client 104 by software executing on client 104.

Whenever appliance 102 is described as performing a task, a single component, a subset of components, or all components of appliance 102 may cooperate to perform the task. Similarly, whenever a component of appliance 102 is described as performing a task, a subcomponent may perform the task and/or the component may perform the task in conjunction with other components. In various embodiments, portions of appliance 102 are provided by one or more third parties. Depending on factors such as the amount of computing resources available to appliance 102, various logical components and/or features of appliance 102 may be omitted and the techniques described herein adapted accordingly. Similarly, additional logical components/features can be added to system 102 as applicable.

As will be described in more detail below, appliance 102 can be configured to work in cooperation with one or more virtual machine servers (112, 124) to perform malware analysis/prevention, including various techniques for providing detection of malware using an instrumented virtual machine environment as disclosed herein. As one example, data appliance 102 can be configured to provide a copy of malware 130 (e.g., a malware sample, which can include potentially malicious content) to one or more of the virtual machine servers for real-time analysis. As another example, a cloud security service 122 can provide a list of signatures of known-malicious documents to appliance 102 as part of a subscription. Those signatures can be generated by service 122 in conjunction with the techniques described herein. For example, if service 122 identifies a new malware associated with the malware sample received from a data appliance (e.g., data appliance 102 or another data appliance), such as using various techniques for providing detection of malware using an instrumented virtual machine environment as disclosed herein, cloud security service 122 can automatically generate a new signature for the newly identified malware and send the new signature to various subscribers (e.g., data appliance 102 and various other data appliances that receive subscription-based signature updates).

An example of a virtual machine server is a physical machine comprising commercially available server-class hardware (e.g., a multi-core processor such as a dual 6-core Intel® processor with Hyper-Threading, 4 or more Gigabytes of RAM such as a 128 GB RAM, a system disk such as a 120 GB SSD, and one or more Gigabit network interface adapters) that runs commercially available virtualization software, such as VMware ESXi, Citrix XenServer, or Microsoft Hyper-V (e.g., such a VM environment can emulate the Windows® XP operating system environment using the dual 6-core Intel® processor with Hyper-Threading and 512 MB of RAM, the Windows® 7 operating system environment using the dual 6-core Intel® processor with Hyper-Threading and 1 GB of RAM, and/or other operating system environments and/or using different hardware capacity/components). The virtual machine servers may be separate from, but in communication with, data appliance 102, as shown in FIG. 1. A virtual machine server may also perform some or all of the functions of data appliance 102, and a separate data appliance 102 is omitted as applicable. Further, a virtual machine server may be under the control of the same entity that administers data appliance 102 (e.g., virtual machine server 112); the virtual machine server may also be provided by a third party (e.g., virtual machine server 124, which can be configured to provide services to appliance 102 via third party service 122). In some embodiments, data appliance 102 is configured to use one or the other of virtual machine servers 112 and 124 for malware analysis. In other embodiments, data appliance 102 is configured to use the services of both servers (and/or additional servers not shown). Thus, in some implementations, the cloud security service can be delivered either as a public cloud or as a private cloud (e.g., deployed locally on an enterprise network using a locally deployed data appliance or server).

In some embodiments, the virtual machine server 124 is configured to implement various emulation-based techniques for providing detection of malware using an instrumented virtual machine environment as described herein with respect to various embodiments (e.g., implemented using instrumented VM environments 126 and 128, which can be executed by cloud security service 122 and/or malware analysis system 132, such as described below with respect to FIGS. 3 and 4, and with respect to various other embodiments disclosed herein). For example, the virtual machine server 124 can provide an instrumented virtual machine environment capable of performing the various techniques as described herein. These instrumented virtual machine (VM) environments 126 and 128 can include, for example, various user level hooks and/or kernel level hooks in the emulated execution environment to facilitate the monitoring of various program behaviors during execution in the virtual environment (e.g., instrumented VM environments, such as described above) and to log such monitored program behaviors for analysis based on the various techniques described herein with respect to various embodiments. Also, in some cases, multiple instances of a malware sample can be performed using multiple VM environments to perform various tests and/or execute using different execution environments (e.g., different versions of an operating system (OS) environment, different versions of an application, etc.).

Figure 2:
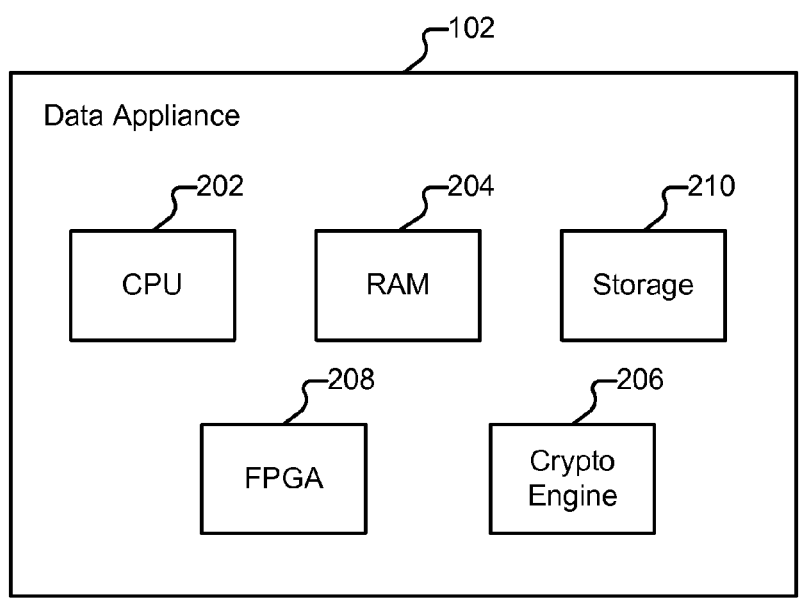
FIG. 2 illustrates a data appliance in accordance with some embodiments.

FIG. 2 illustrates a data appliance in accordance with some embodiments. The example shown is a representation of physical components that are included in data appliance 102, in some embodiments. Specifically, data appliance 102 (e.g., a device that performs various security related functions, such as a security device, which can be in the form of, for example, a security appliance, security gateway, security server, and/or another form of a security device) includes a high performance multi-core CPU 202 and RAM 204. Data appliance 102 also includes a storage 210 (such as one or more hard disks), which is used to store policy and other configuration information. Data appliance 102 can also include one or more optional hardware accelerators. For example, data appliance 102 can include a cryptographic engine 206 configured to perform encryption and decryption operations, and one or more FPGAs 208 configured to perform matching, act as network processors, and/or perform other tasks.

Applying Instrumented Virtual Machines to Analyze Malware Samples

An instrumented virtual machine (VM) can be used to perform behavior profiling (e.g., in a VM sandbox environment) using various heuristic-based analysis techniques that can be performed in real-time during execution of the program in the instrumented virtual environment, such as during a file transfer (e.g., during an active file/attachment download) and/or on files previously collected (e.g., a collection of files submitted for batch analysis). Documents, executables, and other forms of potentially malicious content (e.g., to be evaluated) are referred to herein as "malware samples" or just "samples."

As one example, suppose a malicious user of system 120 sends an email message to a user of client 104 that includes a suspicious or malicious attachment. The attachment may be an executable (e.g., having a file extension of, for example, .exe or .js or some other executable related file extension) and may also be a document (e.g., having a file extension of, for example, .doc or .pdf or some other document related file extension). The message is received by data appliance 102, which determines whether a signature for the attachment is present on data appliance 102. A signature, if present, can indicate that the attachment is known to be safe, and can also indicate that the attachment is known to be malicious. If no signature for the attachment is found, data appliance 102 is configured to provide the attachment to a virtual machine server, such as virtual machine server 112, for analysis.

Virtual machine server 112 is configured to execute (e.g., or open, as applicable, using an appropriate application to open the file using an application that is compatible with opening that file format) the attachment in one or more virtual machines, such as virtual machines 114 and 116 (e.g., instantiated virtual machines in the instrumented virtual machine environment). The virtual machines may all execute the same operating system (e.g., Microsoft Windows) or may execute different operating systems or versions thereof (e.g., with VM 116 emulating an Android operating system or some other operating system). In some embodiments, the VM(s) chosen to analyze the attachment are selected to match the operating system of the intended recipient of the attachment being analyzed (e.g., the operating system of client 104). Observed behaviors resulting from executing/opening the attachment (e.g., to analyze various behaviors while executing/opening the attachment in the instrumented VM environment) are logged and analyzed for indications that the attachment is potentially malicious or malicious.

As discussed above, instantiating multiple virtual machine instances for performing analysis of a given malware sample can be expensive from a computing resources perspective and can also be inefficient from a compute time perspective (e.g., due to the time required to launch an instance of a VM with desired resources, etc., and CPU and memory requirements for executing multiple such VMs on an appliance/server). Thus, to improve performance of malware detection using an instrumented virtual machine environment, in some embodiments, a virtual machine is instantiated in the instrumented virtual machine environment (e.g., virtual machines 114 and/or 116), in which the virtual machine is configured to support installation of two or more versions of a resource (e.g., an executable application that can be used for opening the malware sample which can include a file in a format that is compatible with the executable application, such as two or more versions of Adobe Acrobat® for opening a malware sample that is a PDF file format (.pdf) or two or more versions of Microsoft Word® for opening a malware sample that is a Word document file format (.doc), etc.). Such a virtual machine can then be used to install a first version of the resource and monitor the instrumented virtual machine environment while executing the first version of the resource with the malware sample opened using the first version of the resource. This virtual machine can then also be used to install a second version of the resource on the first virtual machine and monitor the instrumented virtual machine environment while executing the second version of the resource with the malware sample opened using the second version of the resource. As such, the instrumented virtual machine environment can be monitored while executing each version of the resource with the malware sample opened using each version of the resource for at least a predetermined period of time or until malicious behavior is detected (e.g., if there are four versions of the application, then a six minute period of time can be equally allocated among each of the four versions of the application, such that the malware sample is opened using each of the four versions of the malware sample and monitored for approximately 1 minute and 30 seconds). This approach allows for an efficient analysis of the malware sample using multiple different versions of the resource for opening the malware sample and monitoring behavior in the instrumented virtual environment without having to re-instantiate the virtual machine to install and execute such different versions of the resource (e.g., executable application versions).

In some embodiments, such VM-based analysis techniques are performed by the VM server (e.g., VM server 112). In other embodiments, such VM-based analysis techniques are performed at least in part by appliance 102 (e.g., or in some cases, such VM-based analysis techniques can be performed completely by the appliance 102). The malware analysis and enforcement functionality illustrated in FIG. 1 as being provided by data appliance 102 and VM server 112 is also referred to herein as being provided by malware analysis system 132. As explained above, portions of malware analysis system 132 may be provided by multiple distinct devices, but may also be provided on a single platform, as applicable.

If the malware sample (e.g., attachment) is determined to be malicious, appliance 102 can automatically block the file download based on the analysis result. Further, in some embodiments, a signature can be generated and distributed (e.g., to other data appliances) to automatically block future file transfer requests to download the file determined to be malicious.

Techniques for Providing an Efficient and Enhanced Detection of Malware Using an Instrumented Virtual Machine Environment Malware often leverages exploits that are specific to a particular system configuration or set of system configurations. For example, malware 130 might be able to successfully compromise a computer system running a particular operating system version and/or a particular application version, such as Adobe Acrobat® Version 9.0 (e.g., running on client 104), but be unable to compromise a computer system running any versions of Adobe Acrobat® Version 10.0 (e.g., running on client 106). If the only virtual machine used to evaluate malware 130 is an instrumented virtual machine environment with Adobe Acrobat® Version 9.0 installed, then the malicious nature of malware 130 might not be discovered. As another example, malware 130 might be able to successfully compromise a system upon which a particular combination of software is installed (e.g., a specific version of Internet Explorer with a specific version of Java). If the only virtual machine image(s) used to evaluate malware 130 include only one but not both applications, or include different versions of those applications, then the malicious nature of malware 130 might not be discovered.

Some computing environments are relatively homogenous. For example, every employee at a startup might be issued the same laptop, running the same operating system, and with the same base applications installed. More typically, however, a range of different platforms and configurations is supported (e.g., in an enterprise environment). Further, certain employees (e.g., in the Finance Department) may need access to additional software (e.g., Microsoft Access®) not included on the systems of other users. And, employees are often allowed to customize their systems, e.g., by adding or removing software.

Suppose malware 130 targets Microsoft Windows systems. Further suppose that the IT Department of Acme Company supports the following: Windows 7 operating system with either Internet Explorer 9 or 10, and any of Microsoft Office 2007 and 2010 installed. An Acme Company employee may thus potentially be opening malware 130 on any of four different officially supported Windows system and application version configurations. Using the techniques described herein, malware analysis system 132 can efficiently evaluate malware 130 using a single virtual machine instance that can then install and execute each of these four potential application version configurations and will be able to detect that malware 130 is malicious. In particular, this approach to providing dynamic security analysis using an instrumented virtual machine environment is efficiently performed in this case without having to re-instantiate the virtual machine instance by installing and executing each of these four different combinations of application versions in the single virtual machine instance for the Windows 7 operating system. As would be apparent to those of ordinary skill in the art, this approach is more efficient, because such an approach requires less computing resources and time than instantiating and executing four different virtual machine instances corresponding to each of the four potential application version configurations in order to detect that malware 130 is malicious. Thus, as will be described in more detail below, performing runtime installations of different resources (e.g., different versions of one or more applications) can efficiently be made to a single virtual machine instance (e.g., to efficiently test multiple different potential system configurations) to facilitate an efficient detection of and enhanced detection rate of malware using an instrumented virtual machine environment.

A variety of techniques for detection of malware using an instrumented virtual machine environment will be described in conjunction with FIG. 3.

Figure 3:
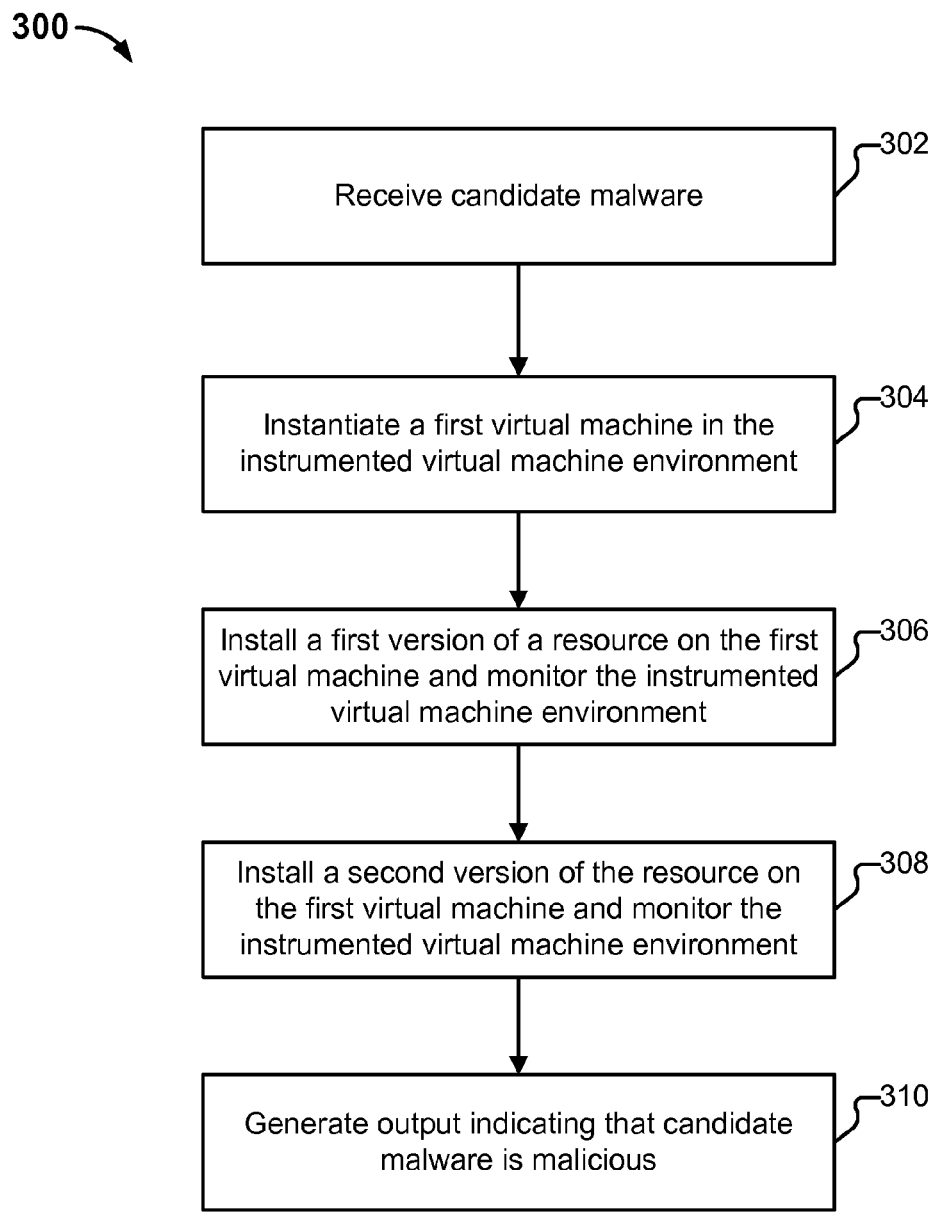
FIG. 3 is a flow diagram of a process for providing detection of malware using an instrumented virtual machine environment in accordance with some embodiments.

FIG. 3 is a flow diagram of a process for providing detection of malware using an instrumented virtual machine environment in accordance with some embodiments. In various embodiments, process 300 is performed by malware analysis system 132. The process begins at 302 when candidate malware (e.g., a malware sample) is received. As one example, candidate malware is received at 302 when an email (e.g., including an attachment) is received by data appliance 102 from system 120. As another example, data appliance 102 can be configured to transmit the attachment to service 122 for analysis. In that scenario, the candidate malware is received by cloud security service 122 at 302.

At 304, instantiating a first virtual machine (i.e., launching a single virtual machine instance for execution) in the instrumented virtual machine environment is performed. In particular, the first virtual machine is configured to support installation of two or more versions of a resource. For example, the candidate malware can be executed in one of virtual machines 114-116 and any behaviors logged for analysis by system 132. As another example, the candidate malware can be executed in one of virtual machines 126-128 and analyzed by cloud security service 122.

At 306, installing a first version of a resource on the first virtual machine and monitoring the instrumented virtual machine environment while executing the first version of the resource with a malware sample opened using the first version of the resource is performed. For example, the candidate malware can be analyzed by opening the candidate malware using the first version of the resource and monitoring behaviors using the instrumented virtual machine environment (e.g., for a predetermined period of time and/or until malicious behavior/activity is detected). In an example implementation, the first virtual machine instance can be configured to include a set of instructions (e.g., startup instructions, such as in an autoexec.bat file), such as a set of instructions to install the first version of the resource and to open the candidate malware using the first version of the resource.

At 308, installing a second version of the resource on the first virtual machine and monitoring the instrumented virtual machine environment while executing the second version of the resource with the malware sample opened using the second version of the resource is performed. In an example implementation, the first virtual machine instance can be configured to include a set of instructions (e.g., startup instructions, such as in an autoexec.bat file), such as a set of instructions to install the second version of the resource (e.g., after a predetermined period of time and/or based on other criteria) and to open the candidate malware using the second version of the resource. In particular, the candidate malware can also be analyzed by opening the candidate malware using the second version of the resource and monitoring behaviors using the instrumented virtual machine environment (e.g., for a predetermined period of time and/or until malicious behavior/activity is detected). In this example, the second version of the resource is installed on the first virtual machine without having to re-instantiate the first virtual machine.

In some embodiments, the resource includes an executable application, and the malware sample includes a file in a format that is compatible with the executable application (e.g., the application can open the malware sample file). In an example implementation, the instrumented virtual machine environment is monitored while executing each version of the application with the malware sample opened using each version of the application for at least a predetermined period of time or until malicious behavior is detected (e.g., and/or until some other criteria is satisfied). In this example implementation, if there are two versions of the application, then a six minute period of time can be equally allocated among each of the two versions of the application, such that the malware sample is opened using each of the two versions of the malware sample and monitored for approximately three minutes. As similarly discussed above, the virtual machine instance can be configured to include a set of (startup) instructions, such as a set of instructions to load the candidate malware using each version of the resource (e.g., where malware 130 is a Microsoft Word or PDF document, and the loading of the malware can be configured to be performed for each version based on a predetermined period of time and/or other criteria).

In some embodiments, two or more different versions of the resource can be installed and efficiently executed using the same VM instance using the following techniques. First, the system environment (e.g., of the VM instance) can be scanned (e.g., including files, registry settings, processes, and services) in a clean state (e.g., prior to installing a version of the resource). Then, the first version of the resource (e.g., a software application, such as Microsoft Office®) can be installed. The system environment can then be scanned again after completion of the installation of the first version of the resource to determine any new items identified, including, for example, any new files that were saved/installed by the installation, registry setting changes, processes launched, and services installed. For example, these new file related items and/or registry key related items can then later be renamed in order to conceal (e.g., hide) the presence of any such file related items and/or registry key related items related to the first version of the resource having been installed in the system environment. After renaming and saving each of such new file related items and/or registry key related items (e.g., using dummy file names and/or dummy directory paths), and performing various additional techniques for handling any new process and/or service related items as further described below, the system environment is returned to an appearance of a clean state as would be apparent to a second version of the resource (e.g., as any items associated with the first version of the resource have been hidden from detection by the renaming of such items to different names/directories and/or renaming any such items to different registry key name/paths, and/or starting/stopping of any processes and/or services, such as further described below).

In some cases, certain resources (e.g., Microsoft Office® and/or various other applications) can install many different files and registry keys. A brute force approach that requires renaming all such items can generally be slow and/or resource expensive. As a result, in some embodiments, another approach can be performed that determines a subset or minimum set of items for renaming to more efficiently perform such renaming operations. For example, assume that for a set of new files located in a directory path of C:\Program Files\Microsoft Office\ that only "Microsoft Office" needs to be renamed in order to hide all of the following items.
C:\Program Files\Microsoft Office\CLIPART\
C:\Program Files\Microsoft Office\CLIPART\PUB60COR\
C:\Program Files\Microsoft Office\CLIPART\PUB60COR\AG00004_.GIF
C:\Program Files\Microsoft Office\CLIPART\PUB60COR\AG00011_.GIF
C:\Program Files\Microsoft Office\CLIPART\PUB60COR\AG00021_.GIF
C:\Program Files\Microsoft Office\CLIPART\PUB60COR\AG00037_.GIF
C:\Program Files\Microsoft Office\CLIPART\PUB60COR\AG00038_.GIF
C:\Program Files\Microsoft Office\CLIPART\PUB60COR\AG00040_.GIF
C:\Program Files\Microsoft Office\CLIPART\PUB60COR\AG00052_.GIF
C:\Program Files\Microsoft Office\CLIPART\PUB60COR\AG00057_.GIF As another example, assume that for a set of new registry keys located in a directory path of HKEY_CURRENT_USER\Software\Microsoft\Office\14.0\ that only "14.0" needs to be renamed in order to hide all of the following items.
HKEY_CURRENT_USER\Software\Microsoft\Office\14.0\Common\
HKEY_CURRENT_USER\Software\Microsoft\Office\14.0\Common\DrawAlerts\
HKEY_CURRENT_USER\Software\Microsoft\Office\14.0\Common\DrawAlerts\FTP Sites\
HKEY_CURRENT_USER\Software\Microsoft\Office\14.0\Common\General\
HKEY_CURRENT_USER\Software\Microsoft\Office\14.0\Common\LCCache\
HKEY_CURRENT_USER\Software\Microsoft\Office\14.0\Common\LCCache\SmartArt\
HKEY_CURRENT_USER\Software\Microsoft\Office\14.0\Common\LCCache\SmartArt\1033\
HKEY_CURRENT_USER\Software\Microsoft\Office\14.0\Common\LCCache\Themes\
HKEY_CURRENT_USER\Software\Microsoft\Office\14.0\Common\LCCache\Themes\1033\
HKEY_CURRENT_USER\Software\Microsoft\Office\14.0\Common\LCCache\WordDocParts\
HKEY_CURRENT_USER\Software\Microsoft\Office\14.0\Common\LCCache\WordDocParts\1033\
HKEY_CURRENT_USER\Software\Microsoft\Office\14.0\Common\LanguageResources\
HKEY_CURRENT_USER\Software\Microsoft\Office\14.0\Common\LanguageResources\EnabledLanguages\

In an example implementation, by using such a minimum rename set for efficiently performing such renaming operations, this process can be performed three to ten times faster, depending on the virtual machine execution environment.

In case of any new processes that are identified during a system environment state scan (e.g., after installation of the first version of the resource), any such new processes can be stopped before swapping to another version of the resource (e.g., before launching/executing the second version of the resource), and any corresponding new process for another version of the resource can be started after such a swap (e.g., after stopping execution of the first version of the resource, and starting execution of the second version of the resource).

In case of any new services that are identified during a system environment state scan (e.g., after installation of the first version of the resource), any such new services can be uninstalled/installed service, if stopping/starting such services is not sufficient to properly execute another version of the resource (e.g., after stopping execution of the first version of the resource, and starting execution of the second version of the resource).

As such, using the above-described techniques, two different versions of the resource can be installed and efficiently executed using the same VM instance. As would now be apparent to those of ordinary skill in the art, these renaming and service/process start/stop operations can be performed to swap between different versions of the resource (e.g., swapping from an execution of the first version of the resource to an execution of the second version of the resource and vice versa, such that if a selected version of the resource is to be executed, then the files/registry keys associated with the selected version of the resource that had been renamed to, for example, various dummy file names, can be renamed to expected file names so that the selected version of the resource can execute properly). As would also now be apparent to those of ordinary skill in the art, this process of scanning the system environment and performing the above-described resource version specific related operations (e.g., renaming of certain files and registry keys, starting/stopping of certain services and/or processes, etc., to facilitate proper execution of different versions of the resource in the system environment) can be repeated to support installation and execution of additional versions of the resource using the same VM instance.

At 310, a determination is made as to whether the candidate malware is malware (e.g., by detecting whether the candidate malware is performing malicious behavior or activity in the instrumented virtual environment). For example, data resulting from the executing of the virtual machine instance executing two different versions of the resource for opening the candidate malware is captured. In particular, the inserting of kernel level and/or user level hooks in the instrumented virtual machine environment can be implemented to facilitate analysis of malware samples. Such hooks may be frequently updated (e.g., by the operator of service 122). In an example implementation, inserting the hooks just prior to execution is efficient, and can also mitigate attempts by malware 130 to determine that it is operating in an instrumented (i.e., hooked) environment (e.g., as certain malware attempt to utilize anti-VM techniques to evade detection in VM environments). As one example, at 306 and/or 308, any modifications to the file system are captured. As another example, at 306 and/or 308, any hooks installed in the instrumented virtual machine environment can report log information (e.g., back to appliance 102 and/or cloud security service 122) for analysis. As yet another example, at 306 and/or 308, network traffic can be captured and logged (e.g., using pcap).

Analyses of the results of emulating the sample are then performed. In some embodiments, various heuristic techniques are used to analyze the results of emulating the sample in order to detect whether the candidate malware (e.g., malware sample can include a file, which can be opened using an appropriate application, and/or a program, such as a script or other executable code or script) executing in the instrumented virtual machine environment is malware (e.g., by detecting whether the candidate malware is performing malicious behavior by monitoring the instrumented virtual machine environment). As explained above, conclusions can be made as to whether the samples are malicious, and signatures can be generated for future use. The virtual machine instance can then be abandoned and new virtual machine instances can be used to evaluate new malware samples using the techniques disclosed herein.

And, if a determination is made that the candidate malware is malware, then at 310, output is generated that indicates that the candidate malware is malware (e.g., based at least in part on a determination that the candidate malware is associated with malicious behavior(s)). As one example, at 310, a signature for the attachment can also be generated (e.g., as an MD5 hash-based signature). As another example, instead of or in addition to generating a signature, an alert can be generated that instructs data appliance 102 not to provide the attachment to client 104.

Figure 4:
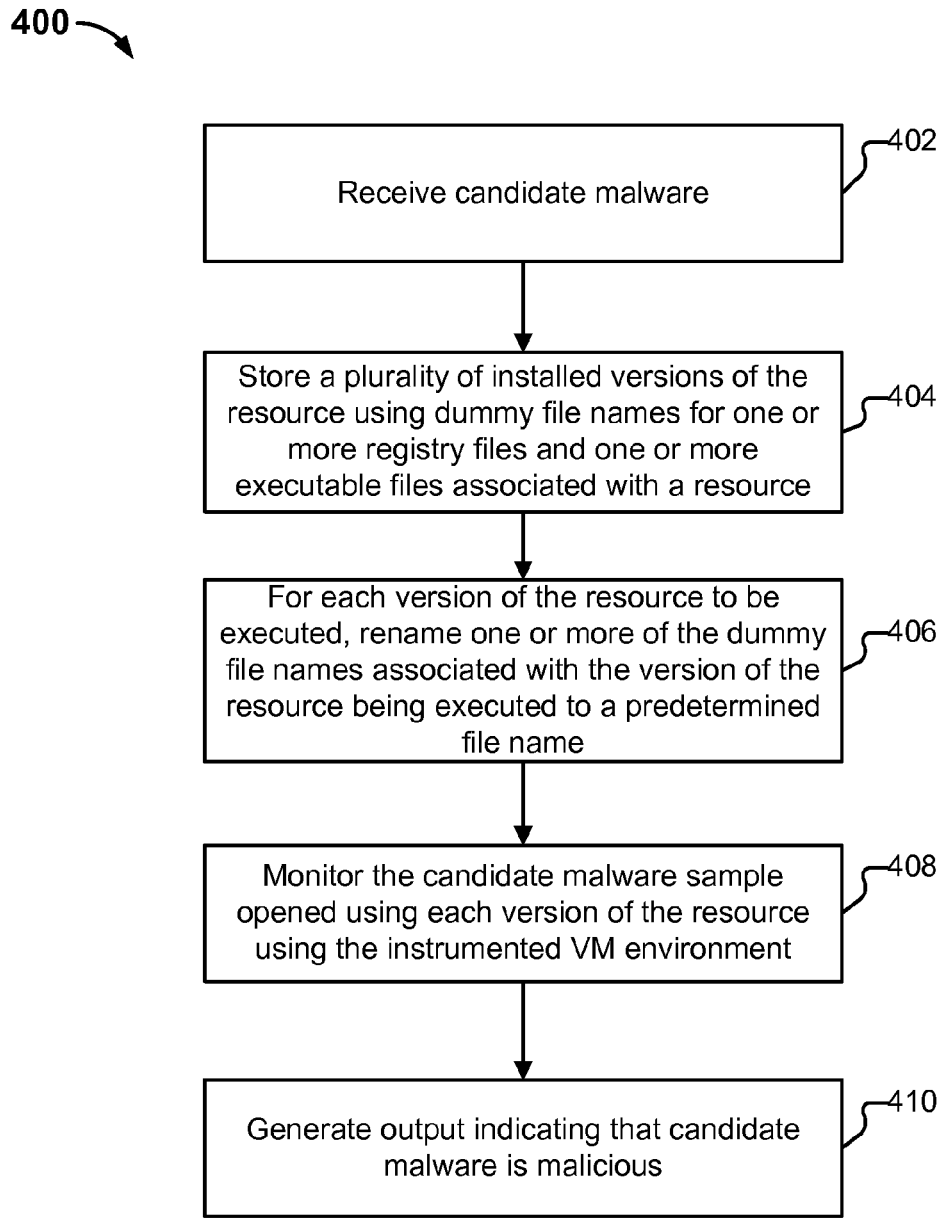
FIG. 4 is another flow diagram of a process for providing detection of malware using an instrumented virtual machine environment in accordance with some embodiments.

FIG. 4 is another flow diagram of a process for providing detection of malware using an instrumented virtual machine environment in accordance with some embodiments. In various embodiments, process 400 is performed by malware analysis system 132. The process begins at 402 when candidate malware (e.g., a malware sample) is received. As one example, candidate malware is received at 402 when an email (e.g., including an attachment) is received by data appliance 102 from system 120. As another example, data appliance 102 can be configured to transmit the attachment to service 122 for analysis. In that scenario, the candidate malware is received by cloud security service 122 at 402.

At 404, storing a plurality of installed versions of a resource using dummy file names for one or more registry files and one or more executable files associated with the resource is performed.

At 406, for each version of the resource to be executed, renaming one or more of the dummy file names associated with the version of the resource being executed to a predetermined file name is performed. For example, the dummy file names that are needed for properly executing a selected version of the resource can be renamed to expected file names so that the selected version of the resource can execute properly.

At 408, monitoring the candidate malware sample opened using each version of the resource using the instrumented virtual machine (VM) environment is performed. For instance, the candidate malware can be analyzed using one or more virtual machines by executing each version of the resource with the candidate malware sample (e.g., malware sample can include a file, which can be opened using each version of the resource, which can be an application program that can open that format of file) in the instrumented virtual machine environment. As an example, the candidate malware can be executed in one or more virtual machines 114-116 and any behaviors logged for analysis by system 132. As another example, the candidate malware can be executed in one or more virtual machines 126-128 and analyzed by cloud security service 122.

In an example implementation, the virtual machine instance can be configured to include a set of instructions (e.g., startup instructions, such as in an autoexec.bat file), such as a set of instructions to load the candidate malware using each version of the resource (e.g., where malware 130 is a Microsoft Word or PDF document, and the loading of the malware can be configured to be performed for each version based on a predetermined period of time and/or other criteria). In this example implementation, the set of instructions can also include the instructions to perform the operations described above at 404 and 406.

At 410, a determination is made as to whether the candidate malware is malware (e.g., by detecting whether the candidate malware is performing malicious behavior or activity in the instrumented virtual environment). For example, data resulting from the executing of the virtual machine instance executing two different versions of the resource for opening the candidate malware is captured, as similarly discussed above. As also explained above, conclusions can be made as to whether the samples are malicious, and signatures can be generated for future use. The virtual machine instance can then be abandoned and new virtual machine instances used to evaluate new malware samples using the techniques disclosed herein.

And, if a determination is made that the candidate malware is malware, then at 410, output is generated that indicates that the candidate malware is malware (e.g., based at least in part on a determination that the candidate malware is associated with malicious behavior(s)). As one example, at 410, a signature for the attachment can also be generated (e.g., as an MD5 hash-based signature). As another example, instead of or in addition to generating a signature, an alert can be generated that instructs data appliance 102 not to provide the attachment to client 104.

Figure 5:
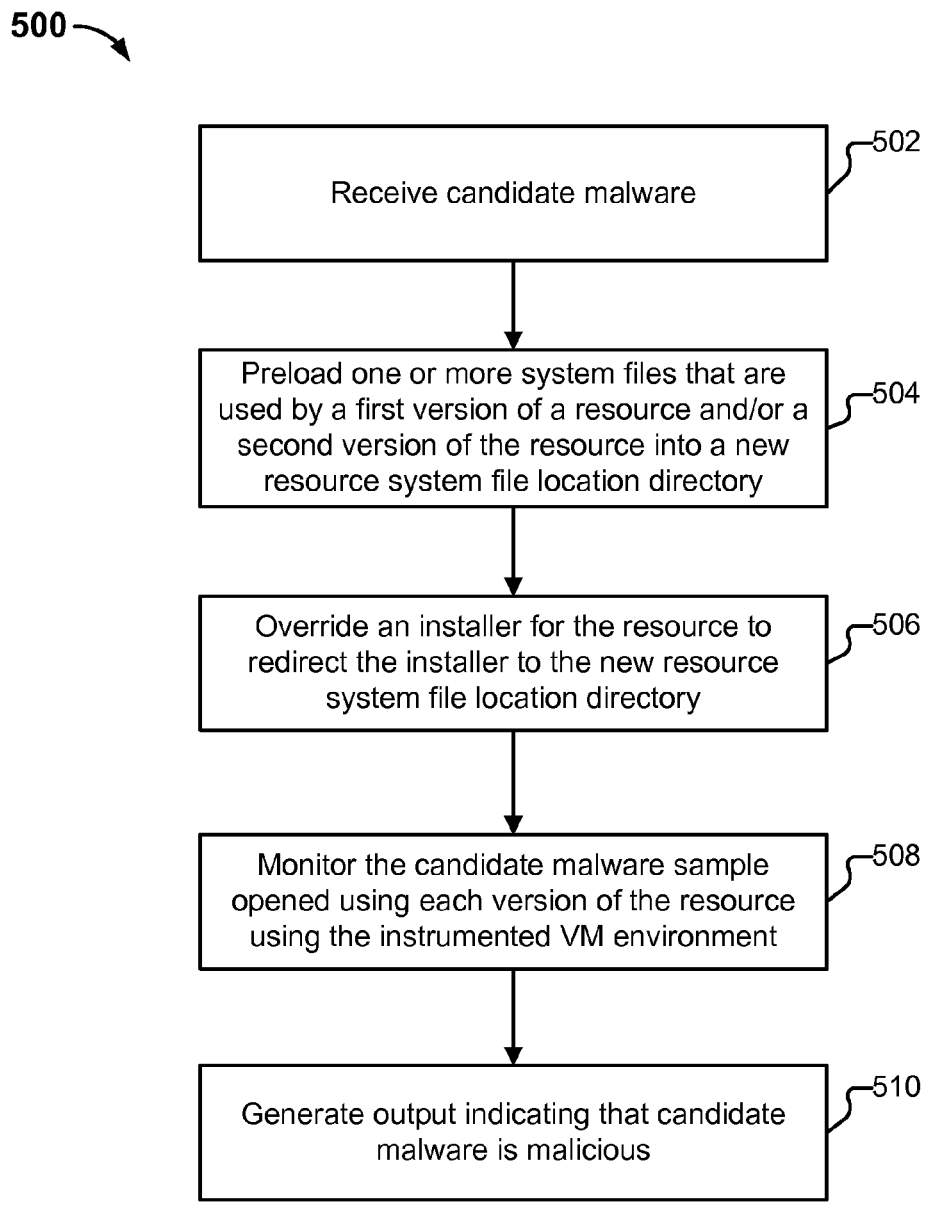
FIG. 5 is another flow diagram of a process for providing detection of malware using an instrumented virtual machine environment in accordance with some embodiments.

FIG. 5 is another flow diagram of a process for providing detection of malware using an instrumented virtual machine environment in accordance with some embodiments. In various embodiments, process 500 is performed by malware analysis system 132. The process begins at 502 when candidate malware (e.g., a malware sample) is received. As one example, candidate malware is received at 502 when an email (e.g., including an attachment) is received by data appliance 102 from system 120. As another example, data appliance 102 can be configured to transmit the attachment to service 122 for analysis. In that scenario, the candidate malware is received by cloud security service 122 at 502.

At 504, preloading one or more system files that are used by a first version of a resource and/or a second version of the resource into a new resource system file location directory is performed. For example, preloading one or more system files can include preloading required libraries (e.g., dynamically loaded libraries (DLLs)) into a local directory so that a program loader can access those files that would not necessarily be available if running a certain version of the operating system (e.g., preloading DLLs into a common files\Adobe-X local directory such that the Adobe application program loader can access such DLLs on the Windows 8 virtual machine instance for a legacy version of that Adobe application that was configured to execute on Windows XP but not Windows 8).

At 506, overriding an installer for the resource to redirect the installer to the new resource system file location directory is performed. For example, the installer of the resource can be modified to load a correct version of common resources, such as to redirect the installer to access certain directors for loading various system files when installing the resource (e.g., such as for loading certain libraries or other operating systems and/or resource related libraries or other components used for installing the resource). In particular, to prevent abnormal operation of a selected version of the resource during execution, certain common resources often would have to be loaded in order to properly select the version of the resource (e.g., C:\program files\common files\resource-X" is a directory for files that will be loaded across the versions; such files can place different versions of files, such as libraries or other common files used by resource-X, under different folders, and redirect the loader to load the correct version of the resource-X; or such resources can be renamed to the correct path before a given version of the resource-X is executed such that it can find the correct version of such libraries or other common files used by resource-X). As another example, the installer of the resource can be modified to bypass a version check during installation (e.g., by disabling version check installer logic and/or hiding/concealing the files/registries that the installer would typically be configured to look for, etc.).

At 508, monitoring the candidate malware sample opened using each version of the resource using the instrumented virtual machine (VM) environment is performed. For instance, the candidate malware can be analyzed using one or more virtual machines by executing each version of the resource with the candidate malware sample (e.g., malware sample can include a file, which can be opened using each version of the resource, which can be an application program that can open that format of file) in the instrumented virtual machine environment. As an example, the candidate malware can be executed in one or more virtual machines 114-116 and any behaviors logged for analysis by system 132. As another example, the candidate malware can be executed in one or more virtual machines 126-128 and analyzed by cloud security service 122.

In an example implementation, the virtual machine instance can be configured to include a set of (startup) instructions, such as a set of instructions to load the candidate malware using each version of the resource (e.g., where malware 130 is a Microsoft Word or PDF document, and the loading of the malware can be configured to be performed for each version based on a predetermined period of time and/or other criteria). In this example implementation, the set of instructions can also include the instructions to perform the operations described above at 504 and 506. In another example implementation, the set of instructions can also include the instructions to perform the operations described above at 404 and 406 as well as to perform the operations described above at 504 and 506.

At 510, a determination is made as to whether the candidate malware is malware (e.g., by detecting whether the candidate malware is performing malicious behavior or activity in the instrumented virtual environment). For example, data resulting from the executing of the virtual machine instance executing two different versions of the resource for opening the candidate malware is captured, as similarly discussed above. As also explained above, conclusions can be made as to whether the samples are malicious, and signatures can be generated for future use. The virtual machine instance can then be abandoned and new virtual machine instances used to evaluate new malware samples using the techniques disclosed herein.

And, if a determination is made that the candidate malware is malware, then at 510, output is generated that indicates that the candidate malware is malware (e.g., based at least in part on a determination that the candidate malware is associated with malicious behavior(s)). As one example, at 510, a signature for the attachment can also be generated (e.g., as an MD5 hash-based signature). As another example, instead of or in addition to generating a signature, an alert can be generated that instructs data appliance 102 not to provide the attachment to client 104.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for detection of malware using an instrumented virtual machine environment, comprising:
   a processor configured to:
   instantiate a first virtual machine in the instrumented virtual machine environment, wherein the first virtual machine is configured to support installation of two or more versions of a resource;
   install a first version of the resource on the first virtual machine and monitor the instrumented virtual machine environment while executing the first version of the resource with a malware sample opened using the first version of the resource, comprising to:

store the first version of the resource using a first dummy file name for a registry file associated with the resource and a first executable file associated with the resource;

install a second version of the resource on the first virtual machine and monitor the instrumented virtual machine environment while executing the second version of the resource with the malware sample opened using the second version of the resource, comprising to:

store the second version of the resource using a second dummy file name for the registry file and a second executable file associated with the resource; and monitor the instrumented virtual machine environment while executing each version of the resource with the malware sample opened using each version of the resource for at least a predetermined period of time or until malicious behavior is detected, comprising to:

rename the first dummy file name to a first expected file name in order to execute the first version of the resource;

execute the first version of the resource based on the first expected file name and the first executable file;

rename the second dummy file name to a second expected file name in order to execute the second version of the resource; and execute the second version of the resource based on the second expected file name and the second executable file; and a memory coupled to the processor and configured to provide the processor with instructions.

2. The system recited in claim 1, wherein the resource includes an executable application, and wherein the malware sample includes a file in a format that is compatible with the executable application.

3. The system recited in claim 1, wherein the second version of the resource is installed on the first virtual machine without having to re-instantiate the first virtual machine.

4. The system recited in claim 1, wherein the processor is further configured to:

preload one or more system files that are used by the first version of the resource and/or the second version of the resource into a new resource system file location directory; and override an installer for the resource to redirect the installer to the new resource system file location directory.

5. The system recited in claim 1, wherein the system executes a cloud security service, and wherein the processor is further configured to:

receive the malware sample at the cloud security service from a security device, wherein the instrumented virtual machine environment is monitored during execution of each version of the resource with the malware sample opened using each version of the resource to determine whether the malware sample indicates potentially malicious behavior.

6. A method for detection of malware using an instrumented virtual machine environment, comprising:

instantiating a first virtual machine in the instrumented virtual machine environment, wherein the first virtual machine is configured to support installation of two or more versions of a resource;

installing a first version of the resource on the first virtual machine and monitoring the instrumented virtual machine environment while executing the first version of the resource with a malware sample opened using the first version of the resource, comprising:

storing the first version of the resource using a first dummy file name for a registry file associated with the resource and a first executable file associated with the resource;

installing a second version of the resource on the first virtual machine and monitoring the instrumented virtual machine environment while executing the second version of the resource with the malware sample opened using the second version of the resource, comprising:

store the second version of the resource using a second dummy file name for the registry file and a second executable file associated with the resource; and monitoring the instrumented virtual machine environment while executing each version of the resource with the malware sample opened using each version of the resource for at least a predetermined period of time or until malicious behavior is detected, comprising:

renaming the first dummy file name to a first expected file name in order to execute the first version of the resource;

executing the first version of the resource based on the first expected file name and the first executable file;

renaming the second dummy file name to a second expected file name in order to execute the second version of the resource; and executing the second version of the resource based on the second expected file name and the second executable file.

7. The method of claim 6, wherein the resource includes an executable application, and wherein the malware sample includes a file in a format that is compatible with the executable application.

8. The method of claim 6, wherein the second version of the resource is installed on the first virtual machine without having to re-instantiate the first virtual machine.

9. The method of claim 6, further comprising:

preloading one or more system files that are used by the first version of the resource and/or the second version of the resource into a new resource system file location directory; and overriding an installer for the resource to redirect the installer to the new resource system file location directory.

10. The method of claim 6, wherein the instrumented virtual machine environment is executed by a cloud security service, and further comprising:

receiving the malware sample at the cloud security service from a security device, wherein the instrumented virtual machine environment is monitored during execution of each version of the resource with the malware sample opened using each version of the resource to determine whether the malware sample indicates potentially malicious behavior.

11. A computer program product for detection of malware using an instrumented virtual machine environment, the computer program product being embodied in a non-transitory, tangible computer readable storage medium and comprising computer instructions for:

instantiating a first virtual machine in the instrumented virtual machine environment, wherein the first virtual machine is configured to support installation of two or more versions of a resource;

installing a first version of the resource on the first virtual machine and monitoring the instrumented virtual machine environment while executing the first version of the resource with a malware sample opened using the first version of the resource, comprising:
storing the first version of the resource using a first dummy file name for a registry file associated with the resource and a first executable file associated with the resource;

installing a second version of the resource on the first virtual machine and monitoring the instrumented virtual machine environment while executing the second version of the resource with the malware sample opened using the second version of the resource, comprising:
storing the second version of the resource using a second dummy file name for the registry file and a second executable file associated with the resource; and monitoring the instrumented virtual machine environment while executing each version of the resource with the malware sample opened using each version of the resource for at least a predetermined period of time or until malicious behavior is detected, comprising:
renaming the first dummy file name to a first expected file name in order to execute the first version of the resource;
executing the first version of the resource based on the first expected file name and the first executable file;
renaming the second dummy file name to a second expected file name in order to execute the second version of the resource; and
executing the second version of the resource based on the second expected file name and the second executable file.

12. The computer program product recited in claim 11, wherein the resource includes an executable application, and wherein the malware sample includes a file in a format that is compatible with the executable application.

13. The computer program product recited in claim 11, wherein the second version of the resource is installed on the first virtual machine without having to re-instantiate the first virtual machine.

14. The computer program product recited in claim 11, further comprising computer instructions for:
preloading one or more system files that are used by the first version of the resource and/or the second version of the resource into a new resource system file location directory; and
overriding an installer for the resource to redirect the installer to the new resource system file location directory.

15. The computer program product recited in claim 11, wherein the instrumented virtual machine environment is executed by a cloud security service, and further comprising computer instructions for:
receiving the malware sample at the cloud security service from a security device, wherein the instrumented virtual machine environment is monitored during execution of each version of the resource with the malware sample opened using each version of the resource to determine whether the malware sample indicates potentially malicious behavior.

* * * * *